United States Patent [19]
Chin et al.

[11] Patent Number: 5,974,034
[45] Date of Patent: Oct. 26, 1999

[54] SYSTEM AND METHOD FOR SYNCHRONIZED WIDE AND LOCAL AREA COMMUNICATIONS UTILIZING A SINGLE FREQUENCY

[75] Inventors: Raymond Chin, Los Altos; Arlin Torbett, Atherton, both of Calif.

[73] Assignee: GWcom, Inc., Santa Clara, Calif.

[21] Appl. No.: 08/784,804

[22] Filed: Jan. 16, 1997

[51] Int. Cl.$^6$ .................................................. H04Q 7/20

[52] U.S. Cl. .................. 370/328; 370/343; 370/445; 455/31.3; 340/311.1

[58] Field of Search .................... 370/314, 328, 370/335, 347, 350, 442, 445, 293, 294, 343, 336, 312; 455/31.1, 31.3, 426, 458, 515; 340/311.1, 825.44

[56] References Cited

U.S. PATENT DOCUMENTS

| | | | |
|---|---|---|---|
| 4,644,351 | 2/1987 | Zabarsky et al. | 340/825.44 |
| 4,968,966 | 11/1990 | Jasinski et al. | 340/825.44 |
| 5,257,307 | 10/1993 | Ise | 455/31.3 |
| 5,721,733 | 2/1998 | Wang et al. | 370/332 |
| 5,737,330 | 4/1998 | Fulthorp et al. | 370/346 |
| 5,751,693 | 5/1998 | Dinkins | 340/825.44 |

*Primary Examiner*—Chau Nguyen
*Assistant Examiner*—Soon-Dong Hyun
*Attorney, Agent, or Firm*—Skjerven, Morrill, Macpherson, Franklin & Friel LLP; Edward C. Kwok

[57] ABSTRACT

A system and a method provide a communication network using time-division multiplexing and a single frequency to achieve maximum utilization of the spectrum and the available bandwidth. In one embodiment, time-division multiplexing is used to share the bandwidth between a wide-area transmitter, operating over a designated service area, and numerous simultaneous channels using the same frequency between local base stations and their associated user terminals. Each local base station is assigned a different non-overlapping portion of the designated service area. The communication network can accommodate devices of different data rates.

6 Claims, 2 Drawing Sheets

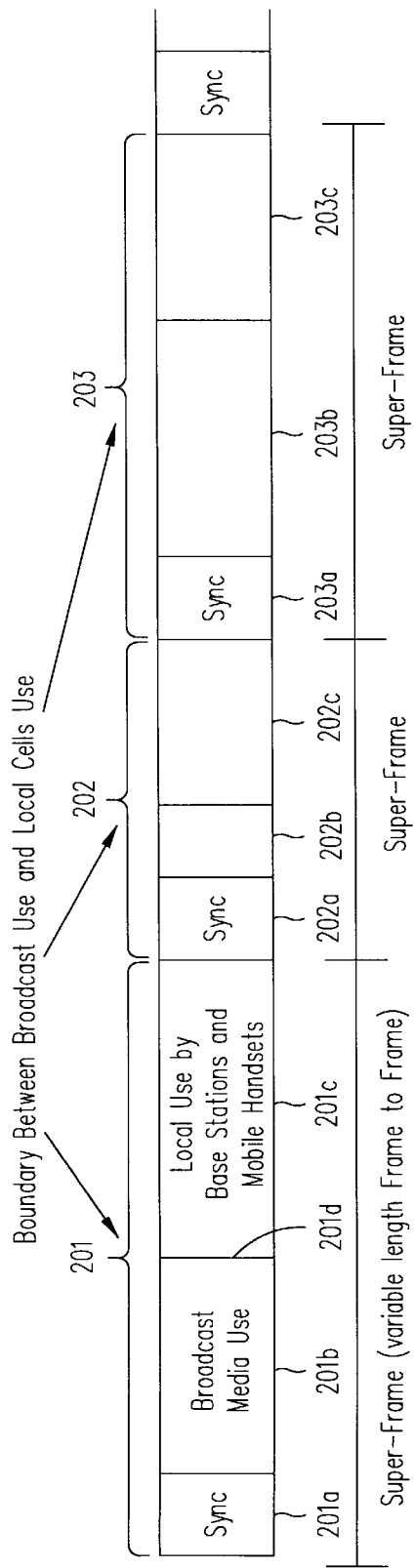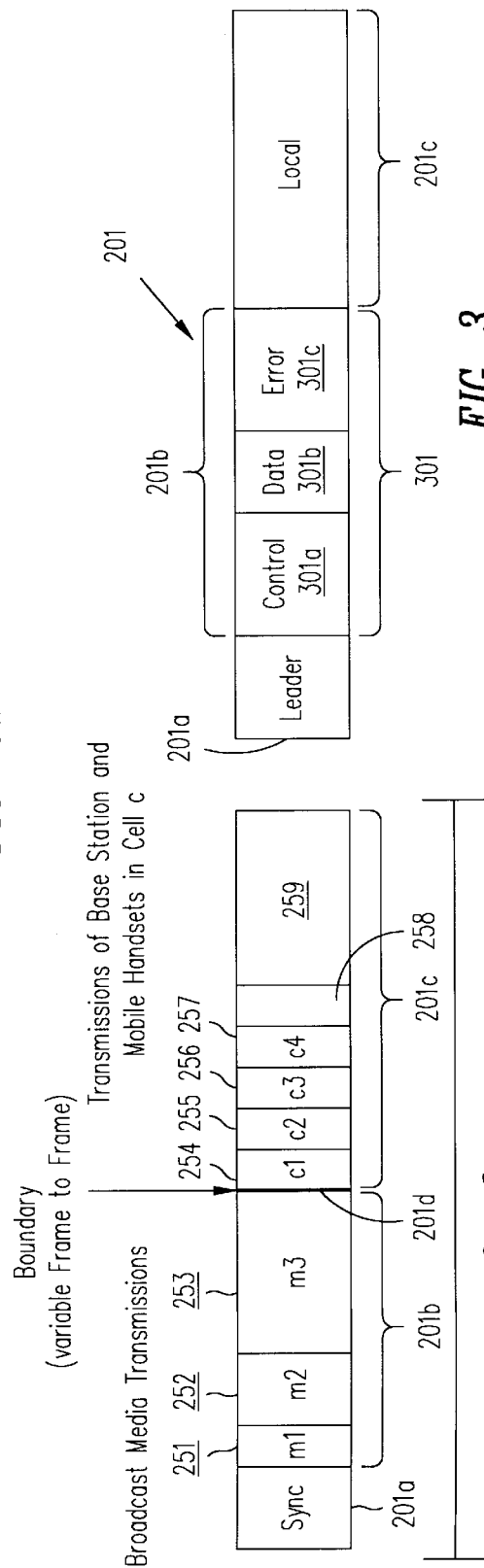

SYSTEM AND METHOD FOR SYNCHRONIZED WIDE AND LOCAL AREA COMMUNICATIONS UTILIZING A SINGLE FREQUENCY

BACKGROUND OF THE INVENTION

1. Field of the Invention

The present invention relates to wireless communications. Specifically, the present invention relates to wireless communication schemes that efficiently use both the available spectrum and the bandwidth.

2. Discussion of the Related Art

In designing a system architecture and the communication protocols for a wireless communication system or network, efficient use of the available bandwidth and the spectrum are emphasized. In addition, if the wireless communication network is designed for a wireless messaging application, e.g. two-way paging, the users' mobility further requires that a low power radio frequency (RF) transmission scheme be used, so as to reduce the instantaneous battery power output requirements and to extend overall battery life. However, this low power requirement also results in the user terminal having a relatively short RF transmission range. From a system perspective, for a given geographical area, a shorter RF transmission range in the user terminal requires a larger number of base stations to cover the service needs of that geographical area. The requirements for adequate coverage are especially stringent in a metropolitan area, where the background noise is high.

An addition consideration in designing a mobile wireless network involves the mechanism for locating a user prior to transmitting information to that user by the wireless network. In a prior art two-way paging application, a powerful central transmitter broadcasts the message to all users continuously on one frequency, and the mobile user responds to or acknowledges the information through a local base station on another frequency.

Another method useful in a metropolitan area is point-to-point communication. In the prior art, to provide point-to-point communication, one or more high power transmitters broadcast messages over a large geographical area. These same transmitters are also associated with receivers for receiving return signals from the user. Under this system, however, the mobile user joint requirements of low-power and relative large operating range constrains communication to a very low data rate. This low data rate makes impractical many applications of interest to users of these devices.

In the prior art, a typical cellular system uses a different method that requires all system communication to be conducted between the user and a local base station in the user's vicinity. While this method minimizes the battery power requirement for transmissions from the user, a more sophisticated system architecture is required. In such a system, the wireless network must be able to locate a base station closest to the user (from an RF perspective) before communication can occur. This method is often used for wireless data communications. However, even under this method, the battery life of a mobile user terminal is still compromised because the user terminal has to communicate frequently with a base station to allow the wireless network to track the user's location in order to route any message designating the user. Alternatively, to track the user's location, a polling scheme can be used. Under the polling scheme, each base station periodically polls its service area to identify the mobile units within the service area. However, such a polling scheme is impractical when a large number of base stations are involved.

Thus, in the prior art, two-way wireless communication over a large geographical area requires at least two separate frequencies: one frequency is used for transmitting messages from a central location of the wireless network to a wireless terminal, regardless of whether the terminal is mobile or stationary, and a separate frequency is used for sending messages from the wireless terminal to a base station. In the prior art, such a base station is a radio receiver for receiving messages from the wireless user terminal. Using separate frequencies, the need for a complicated antenna system and complex electronics necessary for separating transmitted and received signals are avoided, thereby reducing total system cost. Different frequencies for transmitting and receiving are also used in a cellular system, which use large groups of adjacent frequencies at the same location.

SUMMARY OF THE INVENTION

The present invention efficiently share a single frequency among multiple transmitters and base stations operating simultaneously in the same geographical area. The present invention is also applicable to groups of transmitters and base stations operating simultaneously in the same geographical area on different frequencies. The present invention is applicable not only to wireless electronic messaging and data communications, but also to such other applications as voice communication.

By using a single radio frequency, the present invention achieves the following advantages: (i) low instantaneous power requirements and extended battery life; (ii) efficient utilization of the frequency spectrum and the ability to accommodate multiple data rates; (iii) simple antenna and standard electronic configuration; and (iv) simple method of locating users by the wireless network, thereby preserving battery life and providing large system capacity.

In one embodiment, the communication system includes: (a) a wide area transmitter, which has an operating range over the intended geographical area, for broadcasting control and data messages over the geographical area using a selected frequency; (b) numerous local base stations each being assigned an operating range over a different portion of the geographical area to handle local message traffic over the assigned operating range; and (c) numerous user terminals distributed in the geographical area to receive the control and data messages from the wide area transmitter, and to communicate with the numerous local base stations. The message traffic between a local base station and the user terminals within the local base station's operating range constitutes the local message traffic. The local message traffic of a local base station can be active simultaneously with local message traffic of other local base stations since each local base station is assigned a non-overlapping geographical area as its operating range. The bandwidth is divided between the messages of the wide area transmitter, and the simultaneous local message traffic between user terminals and local base stations using a time division multiplexing scheme. Because a user terminal actively transmits only as local message traffic to a local base station when the wide area transmitter is not active, power consumption by user terminals are low because of both the limited geographical range and the limited time of operation. During the appointed times at which local message traffic can take place, i.e. the wide area transmitter is not active, the communication between a local base station and a user terminal can proceed asynchronously using an asynchronous protocol, such as a carrier sensing multiple access (CSMA) communication protocol. Further, different data rates can also be provided during the appointed times, to allow system upgrades and to accommodate in the same network equipment of different data rate capabilities. Using a network control center, a point-to-point communication channel can be established between two user terminals, using the network control center and the local base station in the vicinity of each user terminals as intermediaries. The network control center can similarly connect a user terminal to an external network through a gateway coupled to the network control center.

The present invention is better understood upon consideration of the detailed description below and the accompanying drawings.

BRIEF DESCRIPTION OF THE DRAWINGS

FIG. 2a shows superframes 201–203 used in communication system 100.

FIG. 2b shows the structure of superframe 201 in further detail.

FIG. 3 shows a framing structure suitable for implementation in broadcast subframe 201b.

DETAILED DESCRIPTION OF THE PREFERRED EMBODIMENTS

Figure 1:
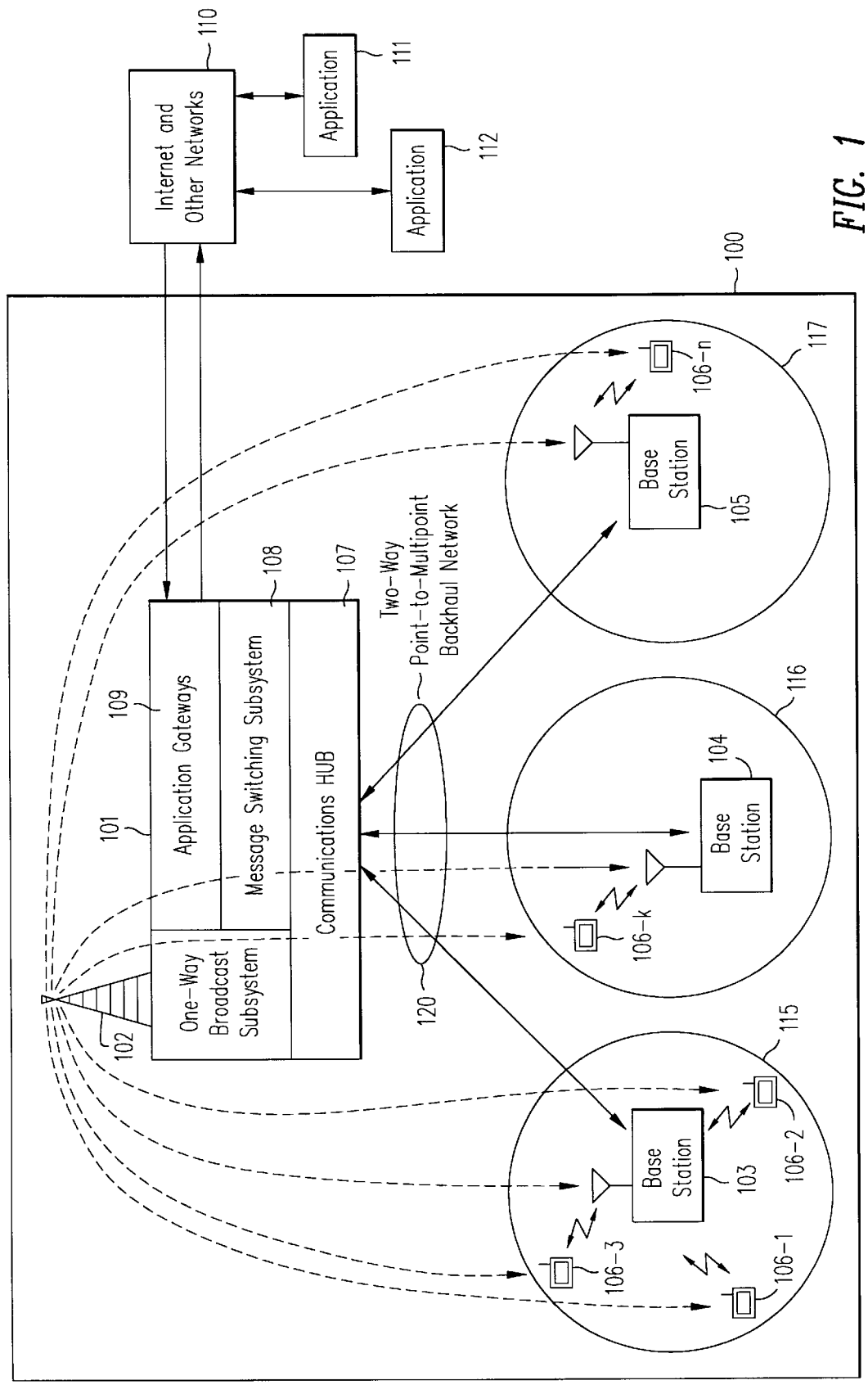
FIG. 1 shows the architecture of a communication system in accordance with the present invention.

The present invention use a single frequency for both wide area and local area communications. In addition, the present invention uses a time-division multiplexing technique to share the bandwidth among (i) one or more wireless network control centers, each having a wide area communication capability, (ii) a number of local base stations, each having a local area communication capability and (iii) a number of fixed or mobile terminals, each capable of communicating locally with the base stations and receiving messages from the wireless network control centers. The present invention is applicable to wireless electronic messaging, which includes such applications as two-way paging, wireless connection to a public network (e.g. internet), wireless facsimile transmission, and wireless electronic mail services.

The present invention is illustrated by the communication system or network of FIG. 1. FIG. 1 shows the architecture of a communication system or network 100 in accordance with the present invention. In FIG. 1, a network control center 101 has a wide area transmitter 102, which is a transmitter having a range that is many times greater than the local area transmitters of the local base stations discussed below. Communication system 100 also includes a number of local area base stations 103–105, each connected to network control center 101 and having a local area transmitter with a range designed to cover a subset of the service area of wide area transmitter 102. Local base stations 103–105 each service a number of mobile terminals, 106-1 to 106-n within their respective operating ranges 115–117. In communication system 100, there can be multiple network control centers, each transmitting through one or more wide area transmitters. Local base stations 103–105 are coupled to network control center 101 over a two-way point-to-multipoint backhaul network 120 managed by "communication hub" subsystem 107. The present embodiment handles at least two modes of operations. In the first mode, messages are received into network 100 from a source external to the network designating a user terminal with network 100. In the second mode, messages are routed from one user terminal to either another user terminal within communication network 100, or to a destination outside of communication network 100. Two-way point-to-multipoint backhaul network 120 can be a wired or a wireless network. Network control center 101 routes point-to-point messages between user terminals, between a user terminal and a local base station, and between base stations using a message switching subsystem indicated generally by reference numeral 108. In addition, FIG. 1 shows an application gateway 109, which connects communication system 100 to resources (e.g. application program 111) in an external network 110, such as the internet.

Transmissions from network control center 101, local base stations 103–105, and user terminals 106-1 to 106-n are synchronized to share a common communication frequency under a time-division multiplexed access (TDMA) scheme. To achieve this TDMA scheme, which is discussed below, communication occurs within a "superframe", which is a synchronized time period divided into a first set of slots assigned to network control center 101 and a second set of slots that is used by base stations 103–105 simultaneously for their respective communications with user terminals, whether fixed or mobile, in their respective service areas of 115–117. In the present embodiment, base stations 103–105 are assigned non-overlapping service areas to maximize the reuse of the same frequency resource or spectrum.

In the present embodiment, network control center 101 uses wide area transmitter 102 to notify, under either mode of operations, a user at a user terminal that a message designating the user is received at the network control center 101. Wide area transmitter 102 transmits system-wide broadcast messages at a designated portion of the superframe. To retrieve the message from network control center 101, the user connects to wireless network 100 through a base station serving the user's vicinity.

Superframes 201–203 used in communication system 100 are shown in FIG. 2a. These superframes used in communication system 100 have variable durations. Thus, FIG. 2a shows consecutive superframes 201–203 of different durations. Each superframe includes a synchronization subframe (e.g. synchronization subframe 201a), a broadcast subframe (e.g. broadcast subframe 201b), and a local subframe (local subframe 201c). Synchronization subframe 201a, which includes a distinctive bit pattern broadcast by network control center 101 over wide area transmitter 202, synchronizes the local base stations and the user terminals with network control center 101 and with each other.

Immediately following synchronization subframe 201a, network control center 101 broadcasts its message over broadcast subframe 201b. Broadcast subframe 201b is of variable duration, thus broadcast subframe 201b includes length information to allows the local base stations and the user terminals to determine the beginning of local subframe 201c, indicated in FIG. 2a by reference numeral 201d. Upon completion of broadcast subframe 201b, local subframe 201c begins. During the duration of local subframe 201c, communication between each base station and the user terminals in the local base station's service area is allowed. Since low-power transmitters are used for local base stations 103–105 and user terminals 106-1 to 106-n, communication within each service area can occur independently and simultaneously with communication within another service area without interference. Thus, under the present invention, the same frequency of transmission is used by wide area transmitter 102, local base stations 103–105 and user terminals 106-1 to 106-n. Using the same frequency for all participants allows a user terminal to include only a single receiver for receiving messages from both network control center 101 and the user terminal's local base station. Further, since communication between a base station and user terminals within its service area occurs independently and simultaneously with communication within other service areas, efficient reuse of the frequency spectrum is achieved. In effect, the different service areas constitute multiple communication channels operating simultaneously using the same frequency.

The present invention can provide a number of virtual channels to accommodate devices of a number of different data rates to share the same frequency spectrum. FIG. 2b illustrates a scheme of partitioning superframe 201 to accommodate devices of different data rates. As shown in FIG. 2b, communication between base stations 103–105 and user terminals 106-1 to 106-n can be provided at different data rates by dividing the local subframe 201c a number of subframes 254–259. Each of subframes 254–259 accommodates communication using the same frequency but at a different data rate. In fact, broadcast subframe 201b can also be similarly divided into subframes 251–253 to accommodate different data rates. Using this arrangement, a system operator can begin service using a lower data rate, and upgrades its service to accommodate devices at higher data rates, thereby increasing system capacity incrementally. The maximum data rate depends on the available bandwidth and the radio frequency transmission range required. Typically, the data rate between a local base station and user terminals in its service area is higher than the data rate used by wide area transmitter 102.

Since multiple communications channels can be operated simultaneously during the local portion of a superframe (e.g. local subframe 201c), the overall system capacity is many times that of a prior art paging system that relies on a wide area transmitter to cover a large geographical area for sending messages to a user. If the broadcast subframe (e.g. broadcast subframe 201b) is restricted to transmitting very short messages or control messages, such that the majority of the communication occurs during the local subframe, the number of subscribers that can be supported is maximized. This is because limiting wide area transmitter 102 to broadcasting only short messages, provides a larger proportion of the available airtime or bandwidth to be used for carrying simultaneous local communications.

Under the present invention, all communicating elements of the system are synchronized to each other. In the present embodiment, broadcast subframe 201b consists of a framing structure 301 illustrated in FIG. 3. In FIG. 3, synchronization subframe 201a of appropriate length is provided. Synchronization subframe 201a indicates the beginning of superframe 201, to allow user terminals and local base stations to synchronize with wide area transmitter 102. Following synchronization subframe 201a is control subframe 301a, which contains control information, such as address information, security information, network management information for intended for local base stations 103–105. Data subframe 301b then follows, containing user information, such as short messages informing user terminals 106-1 to 106-n about messages pending at network control center 101 for designated users. Finally, an error correcting/detecting subframe 301c is transmitted to allow the recipient to detect or correct any error which may occur in the transmission. When broadcast subframe 201b completes, local subframe 201c begins.

Under the first mode of operation mentioned above, i.e. when a message is received from an external network, wide area transmitter 102, which broadcasts over a city and its surrounding area, or even a portion of a city, notifies a subscriber at a user terminal that a communication channel should be established with a local base station during local subframe 201c, so as to retrieve a message pending at network control center 101. This notification message is sent in data subframe 301b. Thereafter, local subframe 201c is entered. Of course, one variation from the scheme shown in FIG. 3 is achieved by allowing broadcast subframe 201b to include multiple repeated frames of control, data and error subframes.

Local subframe 201c is a 'quiet' subframe for wide area transmitter 102, during which wide area transmitter 102 does not transmit. During local subframe 201c, any user terminal can establish a communication channel with a local base station via a local communication protocol. Under the first mode of operation discussed above, once a user terminal establishes a channel with a local base station, the user terminal can communicates with another network device either at network control center 101, or in a network external to communication network 100. Local communications that are not finished within the duration of local subframe 201c can continue in the next superframe (i.e. superframe 202).

Alternatively, under the second mode of operation discussed above, i.e. two-way communication initiated by a user terminal within communication network 100 between the user terminal and either another user terminal within communication network 100, or a device at a destination outside of communication network 100, the user terminal establishes during a local subframe 201c a communications channel with its local base station, using a protocol such as a modified carrier detect multiple access (CSMA) scheme. After the communication channel is established, data transmission occurs through the base station to the destination device. If the destination of the message is outside communication network 100, then wide area transmitter 102 is not involved. If the message is destined for another user in communication network 100, either one of the following two data transfer methods between these user terminals can be used. First, a request-for-communication message from the calling user terminal, say user terminal 106-1, is sent to network control center 101, where the message is then kept. A notification, similar to the one used in the first mode discussed above, is then sent at the next available broadcast subframe by wide area transmitter 102 to the called user terminal, say user terminal 106-n, to notify the called user terminal that a request-for-communication message is received at the network control center 102. During local subframe 201c, user terminal 106-n establishes a channel with a local base station to retrieve the request-for-communication message for the user terminal 106-n.

Upon retrieval of the request-for-communication message, called user terminal 106-n may request its local base station, i.e. base station 105, to request from communication hub 107 a point-to-point communication channel. This point-to-point communication channel is created through communication hub 107 and local base stations 103 and 105.

In the case that the calling user terminal desires a point-to-point communication channel with a destination device external to communication network 100, the destination device is connected through switching subsystem 108 and application gateway 109. Thus, communication system 100 is designed such that a large number of applications or resources outside of communication network 100 can be accessed by communication network 100 without imposing any compatibility requirements on these applications or resources.

As mentioned above, local subframe 201c can also be further divided into different time frames or slots, e.g. slots 254–259 shown in FIG. 2b. The duration of each and any given slot is set by network control center 101 and can be varied depending on the traffic requirements. Each local time slot can be designated to operate at a different data rate. Thus, a migration path is provided to allow the network to upgrade from a lower data rate to a higher data rate, while maintaining backward compatibility with existing units in the network. Within local subframe 201c, communications between any of base stations 103–105 and user terminals within its service area can utilize either an asynchronous or a synchronous communication protocol within the allotted timing of local subframe 201c. Of course, under any asynchronous protocol, necessary handshaking signals, addressing, network management, error correction coding must be exchanged to ensure reliable and efficient communications.

The above detailed description is provided to illustrate the specific embodiments and is not intended to be limiting. Numerous modifications and variations within the scope of the present invention is possible. The present invention is defined by the appended claims.

We claim:

1. A communication system comprising:

a wide area transmitter having an operating range over a geographical area, broadcasting a first collection of messages over said geographical area using a predetermined frequency;

a plurality of local base stations, transmitting and receiving a second collection of messages using said predetermined frequency, each local base station having an operating range over a different portion of said geographical area; and a plurality of user terminals distributed in said geographical area receiving said first collection of messages from said wide area transmitter, and transmitting to and receiving from said local base stations said second collection of messages using said predetermined frequency;

wherein said first collection of messages and second collection of messages are transmitted using a time-division multiplexing scheme and wherein said first collection of messages are transmitted synchronously throughout said communication system, and said second collection of messages are transmitted and received asynchronously between a user terminal and one of said local base stations.

2. A communication system as in claim 1, wherein said second collection of messages are transmitted and received using a carrier sensing multiple access (CSMA) communication protocol.

3. A communication as in claim 1, wherein each of said second collection of messages are received and transmitted using a selected one of several data rates.

4. In a communication system, a method comprising the steps of:

operating a wide area transmitter over a geographical area, to broadcast a first collection of messages over said geographical area using a predetermined frequency;

operating a plurality of local base stations to transmit and receive a second collection of messages using said predetermined frequency, each base station having an operating range over a different portion of said geographical area; and operating a plurality of user terminals distributed in said geographical area, each user terminal receiving said first collection of messages from said wide area transmitter, and transmitting to and receiving from said local base stations said second collection of messages, using said predetermined frequency;

wherein said method transmits said first collection of messages and second collection of messages using a time-division multiplexing scheme and wherein said first collection of messages are transmitted synchronously throughout said communication system, and said second collection of messages are transmitted and received asynchronously between a user terminal and one of said local base stations.

5. A method as in claim 4, wherein said second collection of messages are transmitted and received under a carrier sensing multiple access (CSMA) communication protocol.

6. A method as in claim 4, wherein each of said second collection of messages are received and transmitted using a selected one of several data rates.

* * * * *